UNITED STATES PATENT OFFICE.

JEROME JOHN COLLINS, OF SOUTHPORT, ENGLAND.

WINNING OF TIN.

1,414,258. Specification of Letters Patent. Patented Apr. 25, 1922.

No Drawing. Application filed November 1, 1920. Serial No. 421,128.

*To all whom it may concern:*

Be it known that I, JEROME JOHN COLLINS, a subject of the King of Great Britain and Ireland, and resident of Mossdiel House, Ainsdale, Southport, in the county of Lancaster, England, have invented certain new and useful Improvements Relating to the Winning of Tin, of which the following is a specification.

By investigation and experiment, I have found that if dry chlorine gas be caused to act directly on tin bearing rock itself without any mechanical concentration of the tin oxide therein and separation of the same from the gangue, so that the amount of tin in the material may be but four per cent or less, then the heat generated during the reaction is maintained within controllable limits and the process is rendered commercially practicable.

My invention comprises the direct treatment of the tin bearing rock or of the tailings left after the mechanical extraction of tin oxide from the rock, after the reduction of the oxide in the known manner, to the action of dry chlorine gas whereby stannic chloride is produced from which metallic tin is obtained.

In one convenient application of my invention, the tin bearing rock is crushed and subjected to the action of reducing gas at a suitable temperature for converting the tin oxide which the rock contains into metallic tin. No mechanical concentrations of the metal or separation of the same from the gangue is effected but the whole of the material (that is the tin bearing rock after the reduction process) is subjected to the action of dry chlorine gas whereby stannic chloride, which is liquid at ordinary temperatures, is produced. The dry chlorine gas is preferably obtained by the direct expansion into the reaction vessel of anhydrous liquid chlorine, as this ensures that the gas is perfectly dry and obviates the difficulties resulting from the presence of moisture in the gas.

The chloride is evaporated from the mass of material, preferably under a reduced pressure or by blowing air on the heated mass, and is subsequently condensed and converted into hydrated chloride by dissolving in water or collecting over water. Or the tin chloride may be removed by a suitable solvent such as warm water, steam or caustic soda solution.

The tin may be isolated from the chloride by various means but preferably by replacement of the tin by zinc, yielding tin and zinc chloride in the known manner. For such method of recovery, the hydrated chloride is passed over zinc, which may be in the form of turnings or other scrap. The tin is yielded in the form of spongy tin. To prevent precipitation of the tin as oxychloride, the tin chloride solution is preferably warmed and passed through a series of boxes containing zinc. In the first box of the series, there will be an excess of tin in the solution; in the last box of the series there will be an excess of zinc both in the solution and the box, thereby giving a zinc chloride free from tin. The solution is treated or used over again to absorb the tin chloride and to bring up the strength of the solution to reduce the amount of evaporation necessary to bring the zinc chloride to a marketable condition.

The spongy tin is carefully dried and melted into ingots.

The vessel in which the reaction between the chlorine and the metal occurs may be jacketed and a cooling medium circulated through the jacket to maintain approximately atmospheric temperature in the vessel during the reaction, to prevent the formation of chlorides or other metals that may be present in the ore and which would contaminate the tin chloride. Such cooling permits of the use of a cast or wrought iron reaction vessel.

For starting the reaction when working under low temperature conditions, a small amount of tin chloride ($SnCl_4$) is added to the rock before the admission of the chlorine thereto.

When the purpose is to produce pure tin salts, the tin chloride is distilled and condensed as aforesaid and the resulting liquid treated in any convenient and known manner for obtaining the required salts in a commercial form.

If the tin bearing rock contains sulphides or arsenides of iron, it is roasted or calcined to remove the sulphur and arsenic before the reduction process before referred to.

By the process before described, I not only render the winning of metallic tin by the use of chlorine gas commercially possible, but I dispense with the costly and laborious mechanical concentrating operations now usual in order to obtain an ore containing upwards of 60 per cent of metallic tin, thereby providing a simple and economical process.

Having now described my invention, what I claim as new and desire to secure by Letters Patent is:—

A process for the recovery or winning of tin from rock or material containing tin in the form of tin oxide, consisting in crushing the said tin bearing material, reducing the oxide therein to metallic tin, and subjecting the entire mass to the action of chlorine whereby the tin is liquated as stannic chloride, as set forth.

In testimony whereof I have signed my name to this specification.

JEROME JOHN COLLINS.